(12) United States Patent
Bowes et al.

(10) Patent No.: US 7,986,616 B2
(45) Date of Patent: *Jul. 26, 2011

(54) SYSTEM AND METHOD FOR MAINTAINING A LAYER 2 MODIFICATION BUFFER

(75) Inventors: Michael J. Bowes, Mammoth Lakes, CA (US); Eric A. Baden, Saratoga, CA (US); John J. Dull, Sunnyvale, CA (US); Curt McDowell, Mountain View, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/535,739

(22) Filed: Aug. 5, 2009

(65) Prior Publication Data

US 2010/0195645 A1    Aug. 5, 2010

Related U.S. Application Data

(63) Continuation of application No. 11/099,530, filed on Apr. 6, 2005, now Pat. No. 7,583,588.

(60) Provisional application No. 60/631,580, filed on Nov. 30, 2004.

(51) Int. Cl.
*H04L 12/26* (2006.01)
*G06F 15/177* (2006.01)
*G06F 7/00* (2006.01)

(52) U.S. Cl. ........... 370/216; 709/221; 707/625; 714/16

(58) Field of Classification Search ................ 707/625, 707/648, 683
See application file for complete search history.

(56) References Cited

U.S. PATENT DOCUMENTS

| 5,530,855 | A  | * | 6/1996 | Satoh et al. | 707/648 |
| 6,065,018 | A  | * | 5/2000 | Beier et al. | 707/610 |
| 7,583,588 | B2 | * | 9/2009 | Bowes et al. | 370/216 |
| 7,640,275 | B2 | * | 12/2009 | Bridge et al. | 714/19 |
| 2002/0085551 | A1 | * | 7/2002 | Tzeng | 370/389 |

* cited by examiner

*Primary Examiner* — Ayaz R Sheikh
*Assistant Examiner* — Timothy J Weidner

(57) ABSTRACT

A network device for processing packets. The network devices includes a ingress module for performing lookups for layer 2 switching and performing operations for maintaining a layer 2 table. When the ingress module updates the layer 2 table, the ingress module records the operation performed on the layer 2 table in a modification buffer. Entries are added to the modification buffer when the layer 2 table is modified and in the order in which the layer 2 table was modified. The network device thus enables reconstruction of the layer 2 table by performing the operations in the modification buffer.

12 Claims, 6 Drawing Sheets

SYSTEM AND METHOD FOR MAINTAINING A LAYER 2 MODIFICATION BUFFER

CROSS REFERENCE TO RELATED APPLICATIONS

This application is a continuation of U.S. patent application Ser. No. 11/099,530, entitled A SYSTEM AND METHOD FOR MAINTAINING A LAYER 2 MODIFICATION BUFFER, filed on Apr. 6, 2005, and now allowed, which in turn claims priority to U.S. Provisional Patent Application Ser. No. 60/631,580, filed on Nov. 30, 2004. The subject matter of both of the earlier filed applications is hereby incorporated by reference.

BACKGROUND OF THE INVENTION

1. Field of the Invention

The present invention relates to the architecture of a network device in a packet switched network and more particularly to method of synchronizing tables in the network device with tables in a CPU associated with the network device.

2. Description of the Related Art

A packet switched network may include one or more network devices, such as a Ethernet switching chip, each of which includes several modules that are used to process information that is transmitted through the device. Specifically, the device includes an ingress module, a Memory Management Unit (MMU) and an egress module. The ingress module includes switching functionality for determining to which destination port a packet should be directed. The MMU is used for storing packet information and performing resource checks. The egress module is used for performing packet modification and for transmitting the packet to at least one appropriate destination port. One of the ports on the device may be a CPU port that enables the device to send and receive information to and from external switching/routing control entities or CPUs.

As packets enter the network device from multiple ports, they are forwarded to the ingress module where switching and other processing are performed on the packets. Thereafter, the packets are transmitted to one or more destination ports through the MMU and the egress module. During processing, the ingress module performs lookup operations required for layer 2 (L2) switching and implements operations for maintaining appropriate L2 tables. Specifically, the ingress module performs aging and learning operations and implements CPU insert, delete and lookup instructions in certain tables. An aging operation is one in which the device ages/delete entries in an L2 table that have not been accessed for a predefined time period. A learning operation is one in which the device inserts an entry that does not exist in the L2 table. To support some software applications in a CPU associated with the device, the CPU needs to know when layer 2 table entries are modified. Thus, the CPU needs to have a way a tracking modifications to certain tables in the device.

SUMMARY OF THE INVENTION

According to one aspect of the invention, there is provided a network device for processing packets. The network devices includes a ingress module for performing lookups for layer 2 switching and performing operations for maintaining a layer 2 table and a modification buffer. When the ingress module updates the layer 2 table, the ingress module records the operation performed on the layer 2 table in the modification buffer. Entries are added to the modification buffer when the layer 2 table is modified and in the order in which the layer 2 table was modified. The network device thus enables reconstruction of the layer 2 table by performing the operations in the modification buffer.

According to another aspect of the invention, there is provided a method for processing packets in a network device. The method includes the step of performing lookup operations for layer 2 switching and maintaining of a layer 2 table. The method also includes recording operations performed on the layer 2 table in a modification buffer, when the layer 2 table is updated. The entries are added to the modification buffer when the layer 2 table is modified and in the order in which the layer 2 table was modified. The method further includes the step of enabling reconstruction of the layer 2 table by performing the operations in the modification buffer.

According to another aspect of the invention, there is provided an apparatus for processing packets in a network device. The apparatus includes performing means for performing lookup operations for layer 2 switching and maintaining of a layer 2 table. The apparatus also includes recording means for recording operations performed on the layer 2 table in a modification buffer, when the layer 2 table is updated. Entries are added to the modification buffer when the layer 2 table is modified and in the order in which the layer 2 table was modified. The apparatus further includes enabling means for enabling re-construction of the layer 2 table by performing the operations in the modification buffer.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention, wherein.

DETAILED DESCRIPTION OF PREFERRED EMBODIMENTS

Reference will now be made to the preferred embodiments of the present invention, examples of which are illustrated in the accompanying drawings.

Figure 1:
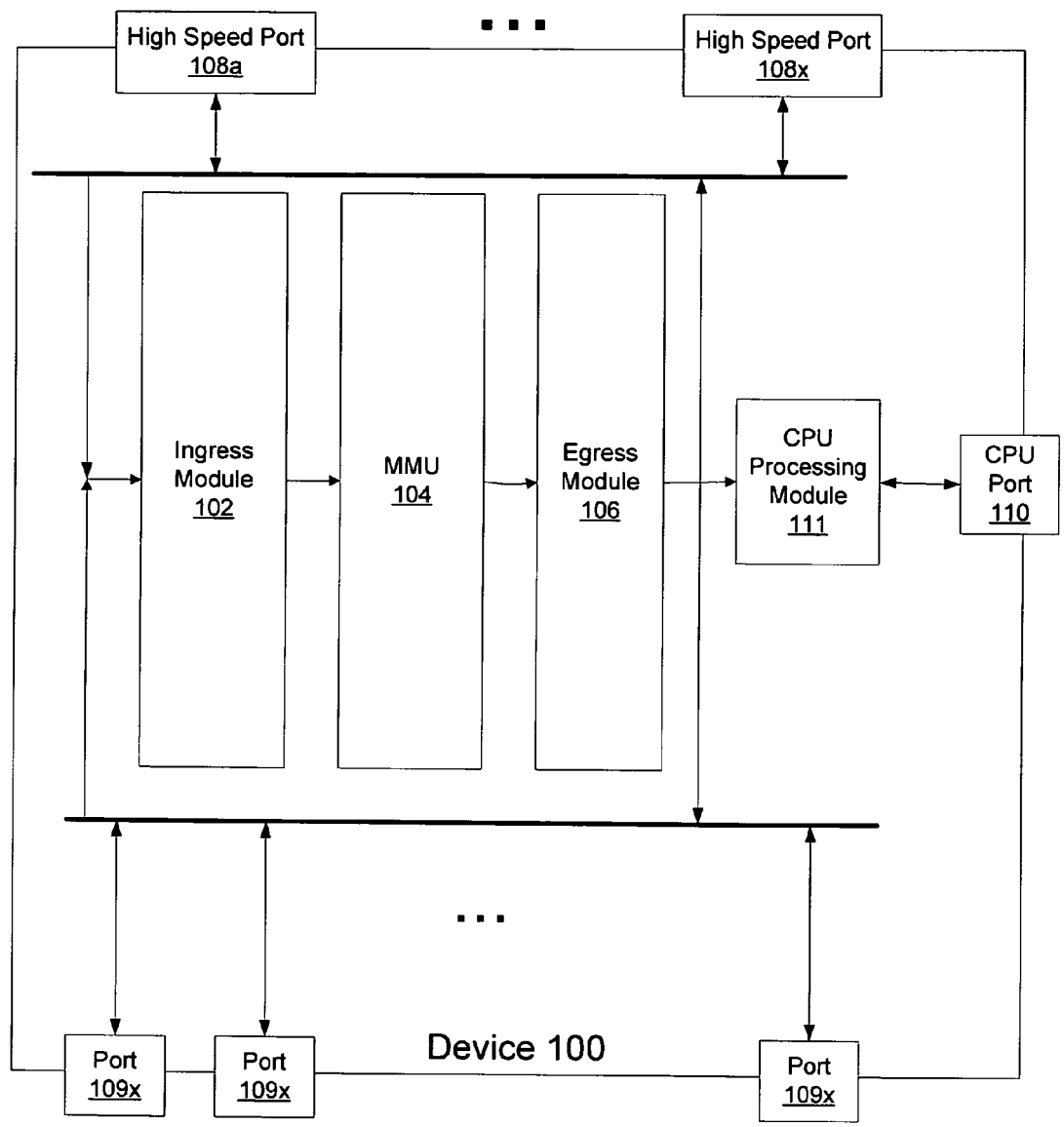
FIG. 1 illustrates a network device in which an embodiment of the present invention may be implemented.

FIG. 1 illustrates a network device in which an embodiment the present invention may be implemented. Device 100 includes an ingress module 102, a MMU 104, and an egress module 106. Ingress module 102 is used for performing switching functionality on an incoming packet. MMU 104 is used for storing packets and performing resource checks on each packet. Egress module 106 is used for performing packet modification and transmitting the packet to an appropriate destination port. Each of ingress module 102, MMU 104 and Egress module 106 includes multiple cycles for processing instructions generated by that module. Device 100 implements a pipelined approach to process incoming packets. The key to the performance of device 100 is the ability of the pipeline to process one packet every clock. According to an embodiment of the invention, device 100 includes a 133.33 MHz core clock. This means that the device 100 is capable of processing 133.33 M packets/sec.

Device 100 may also include one or more internal fabric high speed ports, for example HiGig ports, 108a-108x, one or more external Ethernet ports 109a-109x, and a CPU port 110. High speed ports 108a-108x are used to interconnect various network devices in a system and thus form an internal switching fabric for transporting packets between external source ports and one or more external destination ports. As such, high speed ports 108a-108x are not externally visible outside of a system that includes multiple interconnected devices. CPU port 110 is used to send and receive packets to and from external switching/routing control entities or CPUs. According to an embodiment of the invention, CPU port 110 may be considered as one of external Ethernet ports 109a-109x. Device 100 interfaces with external/off-chip CPUs through a CPU processing module 111, such as a CMIC module, which interfaces with a PCI bus that connects device 100 to an external CPU.

Network traffic enters and exits device 100 through external Ethernet ports 109a-109x. Specifically, traffic in device 100 is routed from an external Ethernet source port to one or more unique destination Ethernet ports. In one embodiment of the invention, device 100 supports physical Ethernet ports and logical (trunk) ports. A physical Ethernet port is a physical port on device 100 that is globally identified by a global port identifier. In an embodiment, the global port identifier includes a module identifier and a local port number and uniquely identifies device 100 and a specific physical port on device 100. The trunk ports are a set of physical external Ethernet ports that act as a single link layer port. Each trunk port is assigned a global a trunk group identifier (TGID). According to an embodiment, device 100 can support up to 128 trunk ports, with up to 8 members per trunk port, and up to 29 external physical ports. Destination ports 109j-109x on device 100 may be physical external Ethernet ports or trunk ports. If a destination port is a trunk port, device 100 dynamically selects a physical external Ethernet port in the trunk by using a hash to select a member port. The dynamic selection enables device 100 to allow for dynamic load sharing between ports in a trunk.

Figure 2:
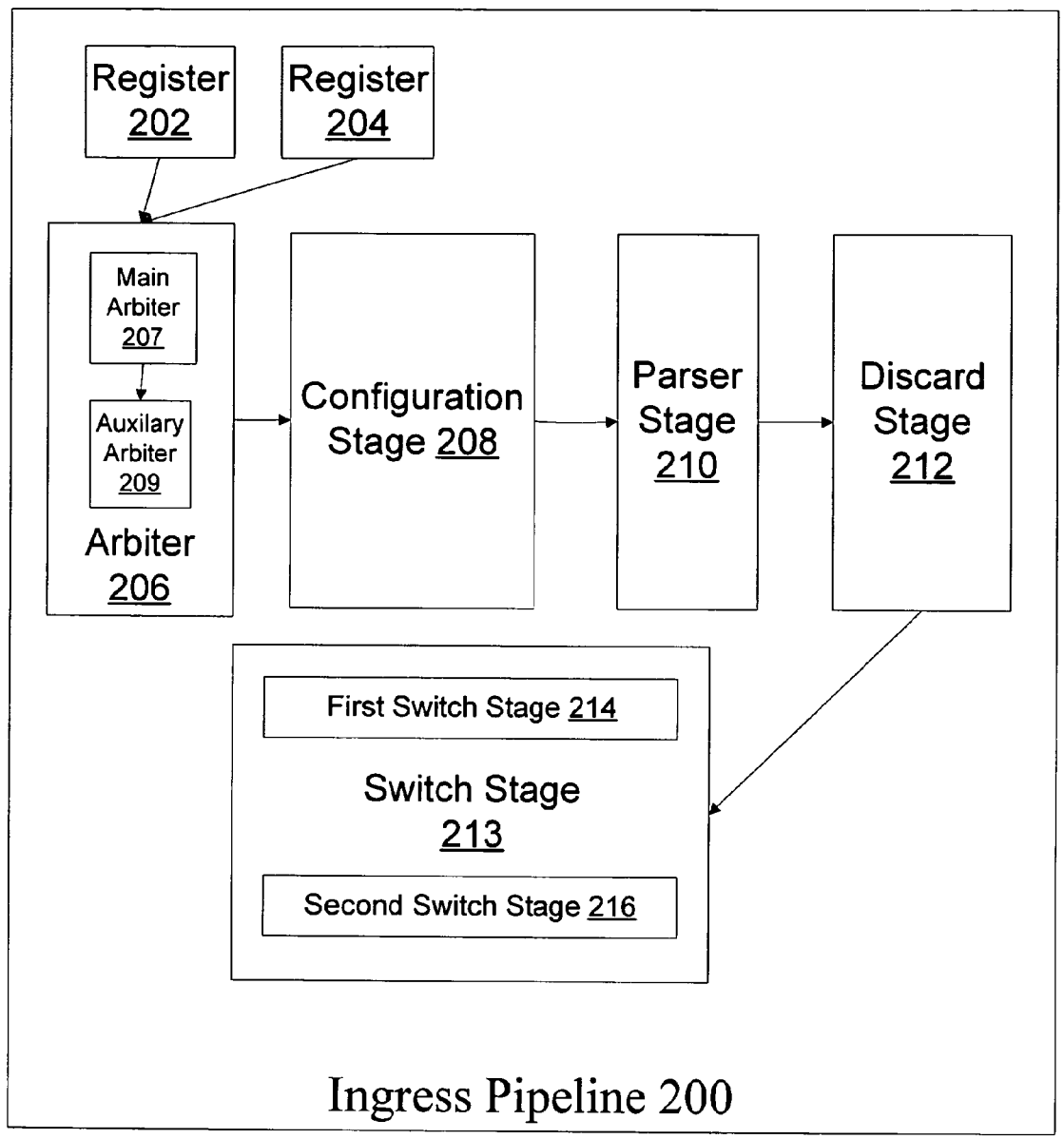
FIG. 2 illustrates a centralized ingress pipeline.

Once a packet enters device 100 on a source port, the packet is transmitted to ingress module 102 for processing. FIG. 2 illustrates an embodiment of the centralized ingress pipeline 200 of ingress module 102. Ingress pipeline 200 processes incoming packets, primarily determines an egress bitmap and, in some cases, figures out which parts of the packet may be modified. Ingress pipeline 200 includes a data holding register 202, a module header holding register 204, an arbiter 206, a configuration stage 208, a parser stage 210, a discard stage 212 and a switch stage 213. Ingress pipeline 200 receives data from port 109a-019i or CPU processing module 111 and stores cell data in data holding register 202. Arbiter 206 is responsible for scheduling requests from ports109a-109i or CPU processing module 111. Configuration stage 208 is used for setting up a table with all major port-specific fields that are required for switching. Parser stage 210 parses the incoming packet and a high speed module header, if present. Discard stage 212 looks for various early discard conditions and either drops the packet and/or prevents it from being sent through pipeline 200. Switching stage 213 performs all switch processing in ingress pipeline 200, including address resolution.

According to one embodiment of the invention, data holding register 202 accumulates the incoming data into one contiguous 128-byte cell prior to arbitration and the module header register 204 stores an incoming 96-bit module header for use later in ingress pipeline 200. Ingress pipeline 200 multiplexes signals from each of port 109a-109i and CPU processing module 111 based on which source is granted access to ingress pipeline 200 by arbiter 206. According to an embodiment, arbiter 206 includes a main arbiter 207 and auxiliary arbiter 209. Main arbiter 207 is a time-division multiplex (TDM) based arbiter that is responsible for scheduling requests from ports 109a-109i, wherein requests from main arbiter 207 are given the highest priority. Auxiliary arbiter 209 schedules all non port requests, including CPU packet access requests, CPU memory/register read/write requests, learn operations, age operations, CPU table insert/delete requests, refresh requests and rate-limit counter refresh requests and auxiliary arbiter 209 is responsible for prioritizing between all non port requests based on available slots from main arbiter 207.

When main arbiter 207 grants a port a slot, the cell data is pulled out of register 202 and sent, along with other information from register 202, down ingress pipeline 200. After scheduling the cell, main arbiter 207 forwards certain status bits to auxiliary arbiter 209. Auxiliary arbiter 209 then prioritizes all non-port requests based on available slots from main arbiter 207 and auxiliary arbiter 209 is also responsible for performing all resource checks to ensure that any operations that are issued simultaneously do not access the same resources. Therefore, auxiliary arbiter 209 implements resource check processing and a strict priority arbitration scheme.

The resource check processing implemented in auxiliary arbiter 209 checks at all possible pending requests to determine which requests can be sent based on the resources that they use. Resources of ingress pipeline 200 are separated into lookup resources for Start cell of packet (SOP) cells, MMU access for all cells, End cell of packet (EOP) resources for EOP cells and L2_MOD_FIFO resource for Layer 2 (L2) operations. As described in more detail below, the L2_MOD_FIFO resource is a 16 entry table that is used for tracking all updates to a L2 table. Since the L2_MOD_FIFO resource is limited, auxiliary arbiter 209 restricts certain operations once the L2_MOD_FIFO resource is full. Additionally, auxiliary arbiter 209 may not schedule access to any address resolution processing faster than once every three clock cycles.

The strict priority arbitration scheme implemented by auxiliary arbiter 209 in an embodiment of the invention requires that CPU access request to be given the highest priority, CPU packet transfer requests are given the second highest priority, rate refresh request are given the third highest priority, CPU memory reset operations are given the fourth highest priority and learn and age operations are given the fifth highest priority. Upon processing the cell data, auxiliary arbiter 209 transmits packet signals, including a L2_MOD_FIFO lock bit to configuration stage 208.

When configuration stage 208 obtains information from arbiter 206, configuration stage 208 sets up the inputs for the port table, multiplexes outputs for other port specific registers and sends the output to parser stage 210. Parser stage 210 manages an ingress pipeline buffer which holds the 128-byte cell as lookup requests traverse pipeline 200. When the lookup request reaches the end of pipeline 200, the data is pulled from the ingress pipeline buffer and sent to MMU 104. If the packet is received on a high speed port, the 96-bit module header accompanying the packet is parsed by parser stage 210. After all fields have been parsed, parser stage 210 writes the incoming cell data to the ingress pipeline buffer and passes a write pointer down pipeline 200. Since the packet data is written to the ingress pipeline buffer, the packet data need not be transmitted further and the parsed module header information may be dropped. Discard stage 212 then looks for various early discard conditions and drops the packet and/or prevents it from being sent through the chip.

Switching module 213 performs address resolution processing and other switching on incoming packets. According to an embodiment of the invention, switching module 213 includes a first switch module 214 and a second switch module 216. First switch module 214 resolves any drop conditions, checks for Layer 2 (L2) source station movement and resolves most of the destination processing for L2 and Layer 3 (L3) unicast packets, L3 multicast packets and IPMC packets. First switch module 214 also performs protocol packet control switching by optionally copying different types of protocol packets to the CPU or dropping them. First switch module 214 further performs all source address checks and determines if the L2 entry needs to get learned or re-learned for station movement cases. First switch module 214 further performs destination calls to determine how to switch packet based on a destination switching information. Specifically, first switch module 214 figures out the destination port for unicast packets or port bitmap of multicast packets, calculates a new priority, optionally traps packets to the CPU and drops packets for various error conditions Second switch module 216 then performs FP action resolution, source port removal, trunk resolution, high speed trunking, port blocking, CPU priority processing, end-to-end Head of Line (HOL) resource check, resource check, mirroring and maximum transfer length (MTU) checks for verifying that the sizing of incoming/outgoing packets is below a maximum transfer length. Second switch module 216 takes first switch module 216 switching decision, any L3 routing information and FP redirection to produce a final destination for switching.

Figure 3:
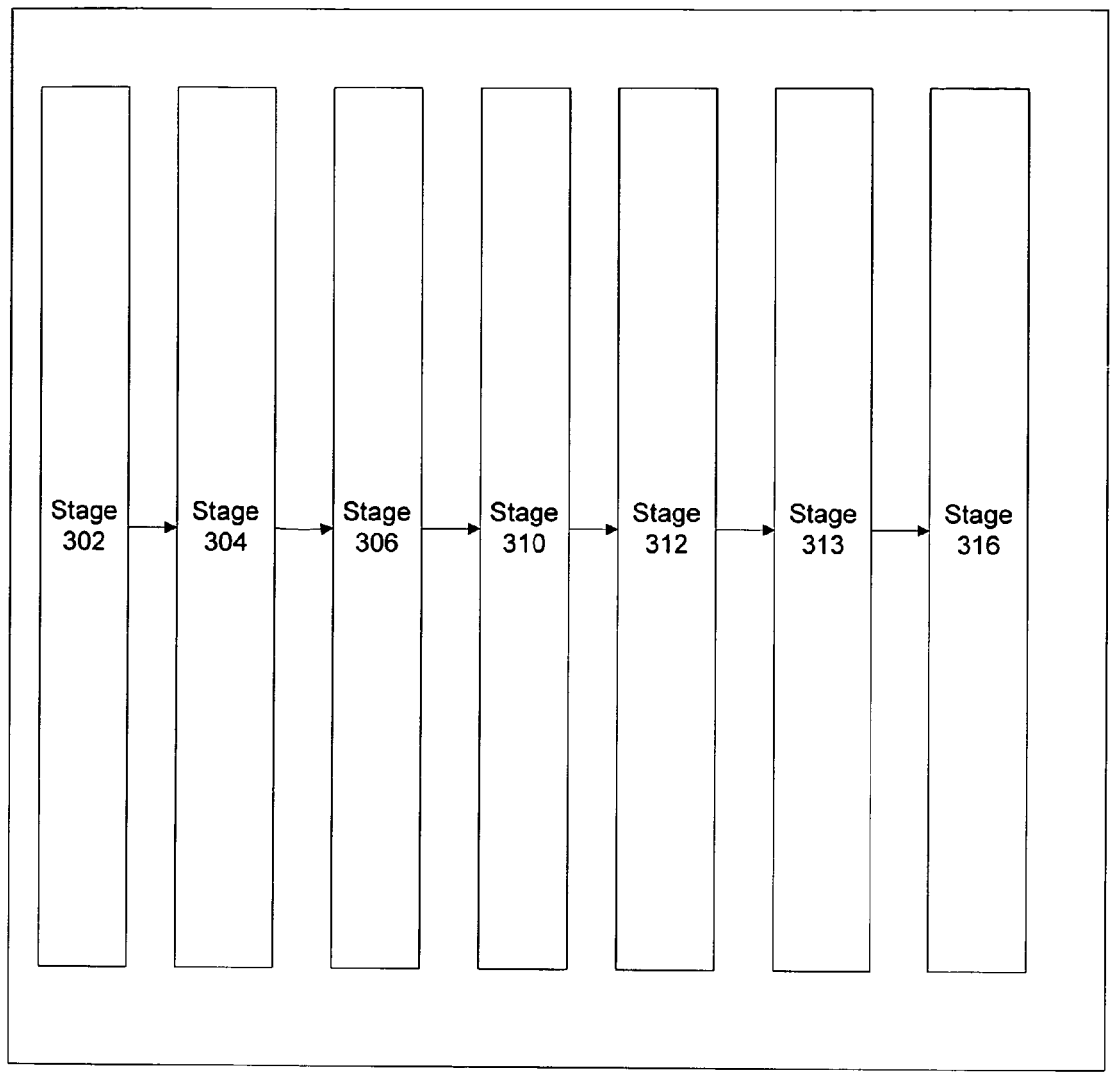
FIG. 3 illustrates the stages of the address resolution processing implemented in the ingress pipeline.

FIG. 3 illustrates the stages of the address resolution processing implemented in ingress pipeline 200. According to FIG. 3, the address resolution processing includes a VLAN translation and origination stage 302, a VLAN stage 304, a L2 lookup stage 306, a L3 Lookup stage 310, a L3 Multicast stage 312, a Longest Prefix Match stage 313 and a Route Select stage 316. VLAN translation and origination stage 302 is used to modify existing VLAN IDs or to determine a VLAN ID to be inserted into a packet that doesn't have one. VLAN stage 304 obtains a spanning tree state and a membership bitmap from a spanning tree state table by using the VLAN ID from stage 302. L2 lookup stage 306 performs lookups required for L2 switching and performs operations for maintaining an L2 table. L3 Lookup stage 310 performs hashed lookups of the Source IP address (SIP) and Destination IP address (DIP) for unicast packets. L3 Multicast stage 312 performs L3 multicast subsequent lookup using a L3 multicast index from stage 310 or a multicast group index for the module header of high speed packets. Longest Prefix Match stage 313 performs a longest prefix match on the DIP and thus determines the best IP subnet match to the address. Route Select stage 316 selects an actual route from a table or an index obtained from prior stages.

Figure 4:
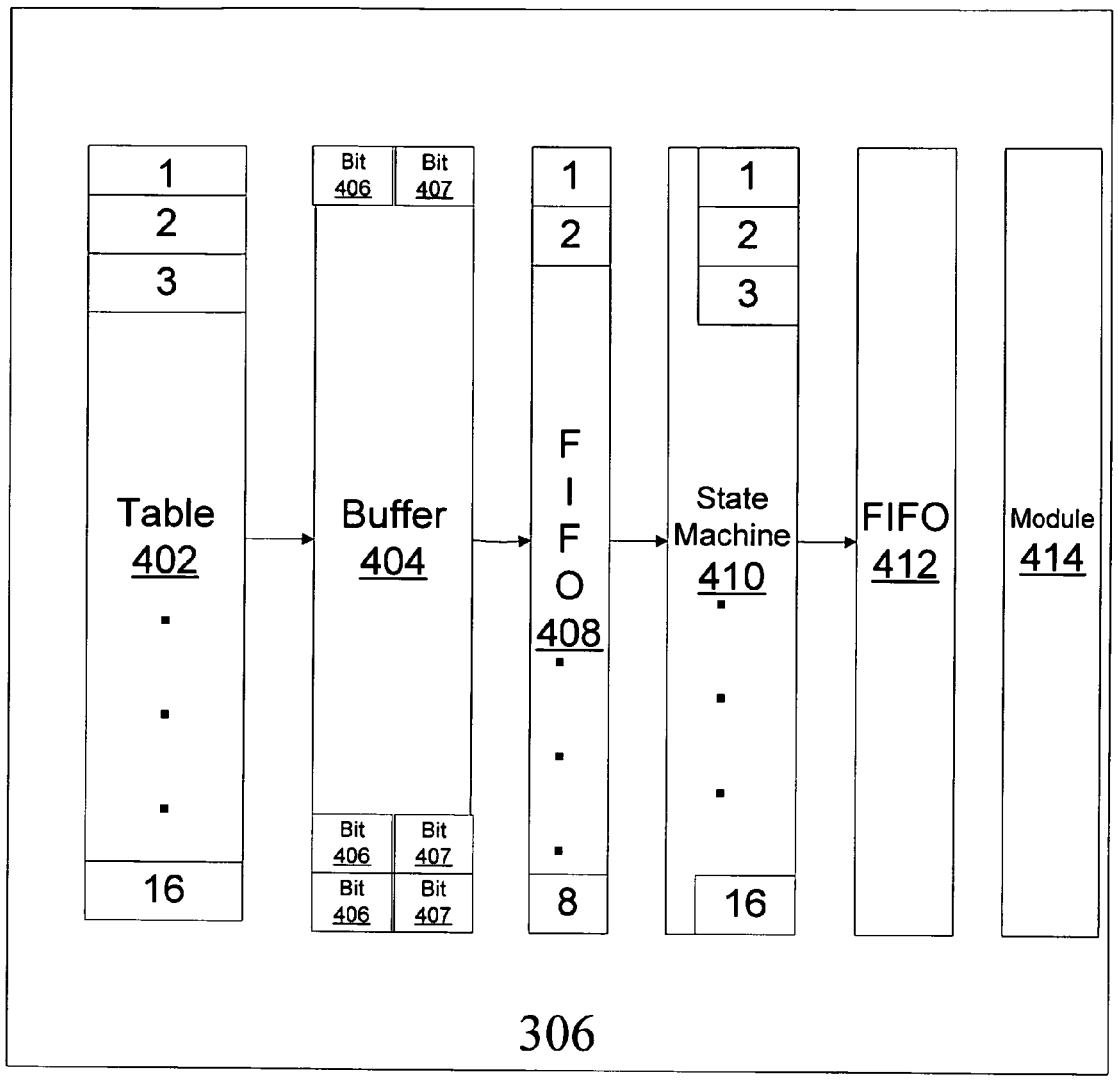
FIG. 4 illustrates the components of a Layer 2 (L2) lookup stage according to an embodiment of the invention.

According to an embodiment of the invention, L2 lookup stage 306 performs lookups required for L2 switching and performs "aging" and "learning" operations to maintain a L2 table. FIG. 4 illustrates the components of the L2 lookup stage according to an embodiment of the invention. L2 lookup stage 306 includes an L2 entry table 402, a possible learn buffer 404, a pending lean FIFO 408, an aging state machine 410, L2 MOD FIFO 412 and acknowledgement module 414. L2 entry table 402 is a dual ported RAM that includes 16 K logical entries, each of which is 91 bits wide. L2 entry table 402 is organized as a set of buckets, each containing eight entries, wherein a bucket number for each bucket is determined by performing a hash operation on a key which includes a VLAN and MAC address.

In an embodiment of the invention, a source port/module or Trunk Group ID (TGID) is associated with every VLAN ID and source address and device 100 learns which port/module or TGID is associated with a given VLAN ID and source address. When a learned source port/module or TGID for a given VLAN ID and source address changes, device 100 determines that station movement has occurred. Specifically, device 100 determines station movement when L2 lookup stage 306 performs source and destination look-ups in L2 entry table 402 using the VLAN ID and Source MAC address and there is a hit in L2 entry table 402 but the source port/module or TGID of the packet does not match the fields of an associated entry in table 402. This mismatch causes stage 306 to schedule a learn instruction. Stage 306 may also schedule a learn instruction when there is a source lookup failure in L2 entry table 402.

When stage 306 schedules a learn instruction, it marks the packet for possible learn operation and places the associated learn entries in possible learn buffer 404. Possible learn buffer 404 includes one entry per port. One embodiment of the invention includes 29 ports, i.e., 23 Gig ports and 3 10 Gig ports and a CPU port, and hence 29 entries in possible learn buffer 404. Possible learn buffer 404 includes an entry for each port to ensure that a learn entry from one port is not stuck behind a particularly long packet from another port. Each entry in possible learn buffer 404 has an EOP_OK bit 406 which indicates whether an EOP status has been received for the packet and if the packet is good. If the EOP status indicates an error in the packet, the entry is deleted from possible learn buffer 404. Each entry in possible learn buffer 404 also has a VALID bit 407 which indicates if there is a source address in the entry. If VALID bit 407 for an entry is cleared, this indicates that there is no source address associated with the entry and the slot is available for a new possible learn entry. As such, an entry is deleted from possible learn buffer 404 by clearing its VALID bits.

Learn entries remain in possible learn buffer 404 until the EOP status is known, the packet is received without errors and there is room in pending learn FIFO 408. If all of these conditions are met, the learn entry is transmitted from possible learn buffer 404 to pending learn FIFO 408. Pending learn FIFO 408 holds addresses to be learned until a learn instruction can be inserted in ingress pipeline 200. Pending learn FIFO 408 is organized as a simple eight entry queue, wherein the entry at the head of the queue competes as a learn instruction with other instructions to enter ingress pipeline 200.

Since the cycles available to learn instructions are limited, entries may wait in possible learn buffer 404 for some time. Therefore, there are likely to be several entries in possible learn buffer 404 that need to be transmitted to pending learn FIFO 408 when a slot in pending learn FIFO 408 becomes available. An embodiment of the invention implements a round-robin arbitration scheme to determine which entry should be transmitted to pending learn FIFO 408.

If it is determined that a new entry needs to be added to L2 entry table 402 due to either source lookup failure or station movement, the learn instruction is inserted into ingress pipeline 202. Once the learn instruction successfully enters the front of ingress pipeline 200, it is transmitted inertly down pipeline 200 until it reaches stage 306 and the actual insertion of the new entry into table 402 occurs when the learn instruction reaches stage 306. An appropriate bucket pointer is then obtained for L2 entry table 402 and all eight entries for that bucket are read out of a L2 RAM and are compared with the key from the learn instruction. If there is a match between the key and a bucket entry, device 100 determines that there is station movement and the new L2-entry values from the learn entry are written into the designated entry. If there is not a match, the learn entry is a new address that is written from the learn instruction, assuming there is an empty entry in the bucket. After leaving stage 302, the learn instruction proceeds inertly down the pipeline as a pipeline bubble because no other operations are required. According to one embodiment, if an entry's key matches the learn entry's key, but a static bit is set in L2 table 402, no learning will occur.

Stage 306 also implements aging operations wherein an aging time limit, i.e., a programmable value usually set to several seconds, is triggered by a decrementing timer. When the timer reaches zero, the aging time limit resets itself to the programmable initial value. This initial value determines the frequency with which the aging process is conducted. When the timer reaches zero, it triggers the aging process and aging state machine 410 automatically starts processing every entry in L2 entry table 402. If VALID bit 407 for that entry is not set, the entry is deleted/aged-out. If VALID bit 407 is set and the entry has aged, then VALID bit 407 is cleared. A request to arbiter 206 to insert an age instruction into pipeline 200 is issued continually until all the buckets have been aged. In an embodiment, there are 2038 buckets, and hence the request is asserted 2038 times per aging process. Once all the aging is complete, aging state machine 410 goes dormant until the decrementing aging timer reaches zero and triggers another aging process. If the programmable initial value for the aging timer is set to a small enough number, the timer will count down to zero before the aging process is complete. To avoid this problem, while performing the aging process, aging state machine 410 will not allow the aging timer to initialize itself to the initial value.

An embodiment of the invention supports Per Port Aging (PPA) wherein a special "aging" mode is used to delete or replace some of the data of specific entries from L2 entry table 402 rapidly. This allows the software associated with the CPU to rapidly change the port/trunk group IP (TGID) and module ID for all entries matching a given port/TGID and module ID, or to simply delete all entries whose port/TGID and module ID match. Thus, if a station moves or is deleted, PPA can be used to quickly update L2 entry table 402 with the new station information or simply delete all entries that reference the obsolete station. To enable such action by the CPU, an embodiment of the present invention allows CPU insert and delete instructions and CPU write instructions. A form of hardware-assisted write to L2 entry table 402 is provided, wherein L2 insert and delete instructions originate as an s-bus transaction from the CPU and terminate with an acknowledgment on the s-bus.

For software associated with the CPU to keep track of modifications to L2 entry table 402, L2_MOD FIFO 412 records whenever an insert, delete, age, learn or CPU write operations occur in L2 entry table 402. L2_MOD FIFO 412 is a 16 entry table. Entries are added to L2_MOD FIFO 412 only when L2 table entry 402 has actually been modified. Since entries are only added to L2_MOD FIFO 412 when L2 entry table 402 is modified, by redoing all the operations in L2_MOD FIFO 412, the software can precisely reconstruct L2 entry table 402. Therefore, operations such as those that only affect VALID bits 407 and age instructions that cause some of the VALID bits of a bucket to be cleared but that do not delete the associated entries will not be recorded in L2 MOD FIFO 412. In an embodiment of the invention, the entries of L2_MOD FIFO 412 include WRITE, PPA_REPLACE, or DELETE operations, wherein WRITE operations are used to directly write into a single entry in L2 entry table 402 replacing all fields with new ones, PPA_REPLACE operations are used for Per-Port-Aging, and DELETE operations are used for age instructions, wherein up to 8 entries of a bucket can be deleted by a single DELETE operation.

An L2_MOD counter is maintained in arbiter 206. The L2_MOD counter maintains a count of the number L2 modification operations at the front of the pipeline 200. The L2_MOD counter is incremented whenever a new L2 modification operation enters the front of pipeline 200 and is decremented if the L2 modification operation does not actually affect L2 table 402. Therefore, every time a learn or age instruction is granted access to pipeline 200, arbiter 206 increments the L2_MOD counter. Since L2_MOD FIFO 412 has only 16 entries, L2 learn and age operations are not permitted to enter the front of pipeline 200 unless the number of entries in the counter is less than sixteen, thereby guaranteeing that L2_MOD FIFO 412 does not overflow. For example, if an L2 insert operation entered the front of pipeline 200, but the L2 insert operation could not be implemented because there were no entries left in its bucket by the time it reached the stage 306, the L2_MOD counter would be decremented. In another example, if an age operation caused some of VALID bits 407 of the bucket to be cleared, but did not delete any of the entries of the bucket, the L2_MOD counter would be decremented. In addition, if a L2 delete operation tried to remove an entry, but the entry did not exist, the L2_MOD counter would be decremented. In yet another example, if any L2 operations enter stage 306, but L2_MOD FIFO 412 is already full, the operation will have no effect on the L2 ENTRY table and the L2_MOD counter will be decremented.

Arbiter 206 also increments the L2_MOD counter every time it allows a CPU insert, delete or CPU write instruction to enter pipeline 200. According to an embodiment of the invention, arbiter allows pipeline 200 access to CPU insert, delete or write operations even if the L2_MOD counter is equal 16. However, these operations are not acknowledged on the s-bus between the CPU and ingress pipeline 200, they have no effect on L2 entry table 402 and the operations are nullified in stage 306.

When the CPU starts to read out entries from L2_MOD FIFO 412, it locks the pipeline by setting a lock bit so that no new L2 operations, i.e. operations that might affect L2_MOD FIFO 412, can enter pipeline 200. If the lock bit is set, learn and age operations are denied entry to pipeline 200 but new CPU insert, delete and write operations to the L2 table are allowed to enter pipeline 200 for none acknowledgment on the s-bus between the CPU and ingress pipeline 200. After setting the lock bit, the CPU performs a series of either direct CPU reads or Direct Memory Access (DMA) of L2_MOD FIFO 412, wherein the read instructions are scheduled by arbiter 206 and they proceed through pipeline 200 to stage 306. The read instructions follow any preceding L2 operations that might have been in pipeline 200 at the time that the lock bit was set. Entries are placed in L2_MOD FIFO 412 from entry 0 to entry 15. Therefore, to facilitate reading the L2_MOD FIFO, the software reads the value of the L2_MOD counter after setting the lock bit.

The lock bit is cleared after the software associated with the CPU has completed reading L2_MOD FIFO 412. A write pointer is then initialized to point to entry 0. As such, clearing the lock bit causes all the entries in L2_MOD FIFO 412 to be invalidated. Since L2 operations are always placed in the same ascending order in FIFO 412, the software does not need to know about head or tail pointers usually associated with FIFO buffers. Therefore, the scheme implemented in an embodiment of the invention provides FIFO-like behaviour and allows the software to read the L2 operations in precisely the order that they were executed on L2 entry table 402.

When a CPU insert and delete instruction enters the front of pipeline 200, a pending learn instruction may be accessing the same L2 entry. An embodiment of the invention system does not make comparisons between these operations since all insert, delete and learn instructions are written into a buffer associated with CPU processing module 111 in the order in which they are actually affect the L2 RAM. Therefore, the software associated with the CPU can reliably reconstruct what happened in L2 entry table 402 and maintain a coherent copy of the L2 table in local memory.

In an embodiment of the invention, L2 operations may be disabled and/or enabled dynamically via a mode bit. If L2 operations are not enabled, L2 operations are not added to L2_MOD FIFO 412. Furthermore, while L2 operations are disabled, there is no restriction on L2 operations entering the front of pipeline 200, the L2_MOD counter will not incremented.

In an embodiment of the invention, stage 306 includes acknowledgement module 414 for L2 insert/learn and L2 delete instructions so that the CPU software can differentiate between a non-acknowledgment caused by table status, such as a full bucket or an entry not found versus a non-acknowledgment caused by L2_MOD FIFO 412 being full. To indicate which of these conditions has occurred, stage 306 sets either a fifo-full-bit or an op-failed-bit. If the fifo-full bit is set, then L2_MOD FIFO 412 is enabled and is either full or locked. If the op-failed-bit is set, this indicates that the operation failed because of conditions in the table. For example, for learn and L2 insert operations, the operation can fail because an entry with a matching key (a replacement due to station movement) was not found and no empty entries were found in which to place a new entry. For an L2 delete operation, the operation can fail if a matching entry with the same key is not found. It is possible for both bits to be set, either one to be set, or neither depending on the results of the operation.

Figure 5:
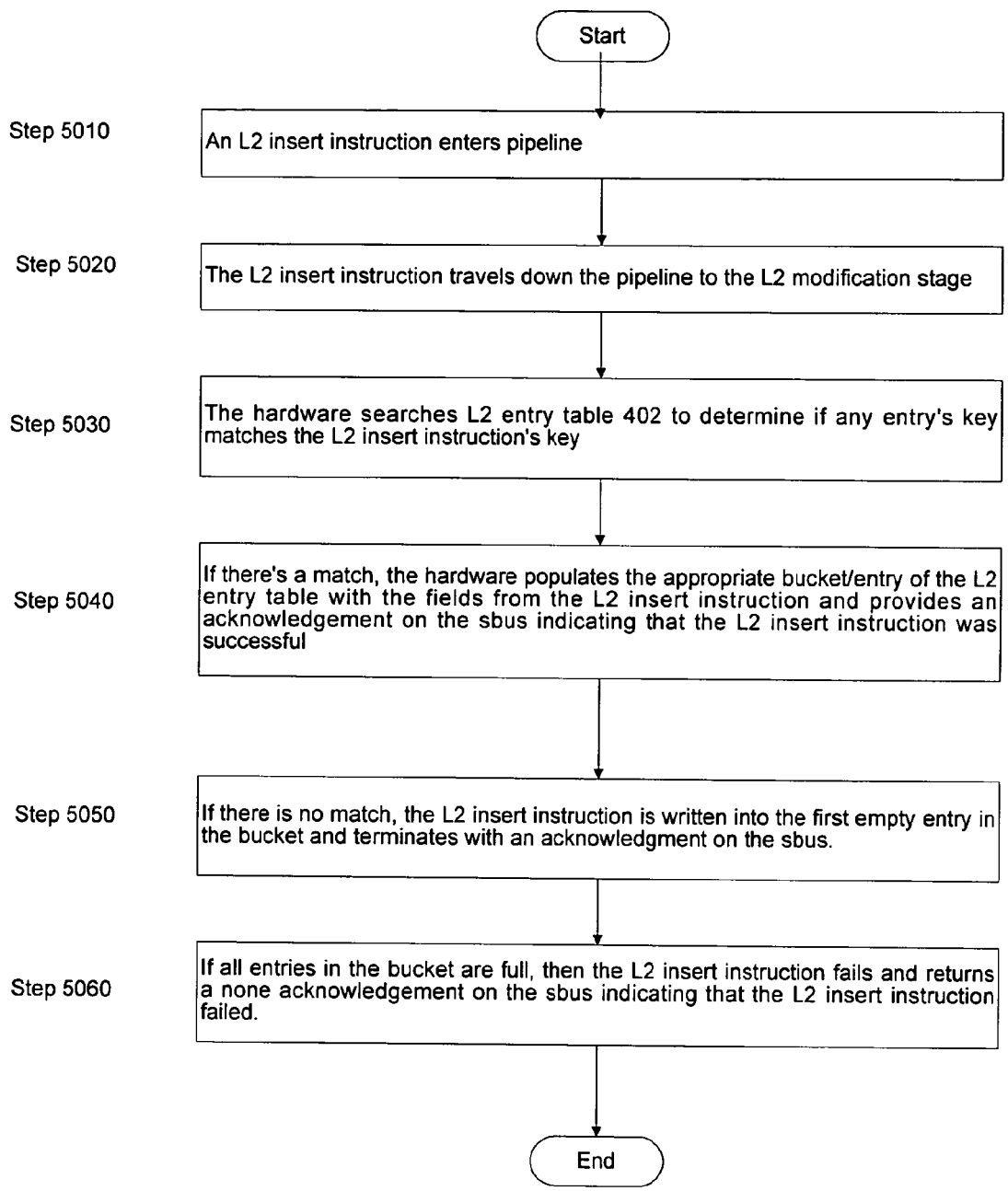
FIG. 5 illustrates the steps implemented in L2 insert operations according to an embodiment of the invention.

FIG. 5 illustrates the steps implemented in L2 insert operations. In Step 5010, L2 insert instructions enter pipeline 200 as an ancillary operation together with L2 delete, age operations learn operation, L3 insert operations, L3 delete operations and CPU reads and writes. In Step 5020, once in pipeline 200, the L2 insert instruction travels down pipeline 200 to stage 306. In Step 5030, in stage 306, the hardware searches L2 entry table 402 to determine if any entry's key matches the L2 insert instruction's key. In Step 5040, if there's a match, the hardware populates the appropriate bucket/entry of L2 entry table 402 with the fields from the L2 insert instruction and provides an acknowledgement on the s-bus indicating that the L2 insert instruction was successful. In Step 5050, if there is no match, the L2 insert instruction is written into the first empty entry in the bucket and terminates with an acknowledgment on the s-bus. In Step 5060, if all entries in the bucket are full, then the L2 insert instruction fails and returns a non-acknowledgement message on the s-bus indicating that the L2 insert instruction failed.

Figure 6:
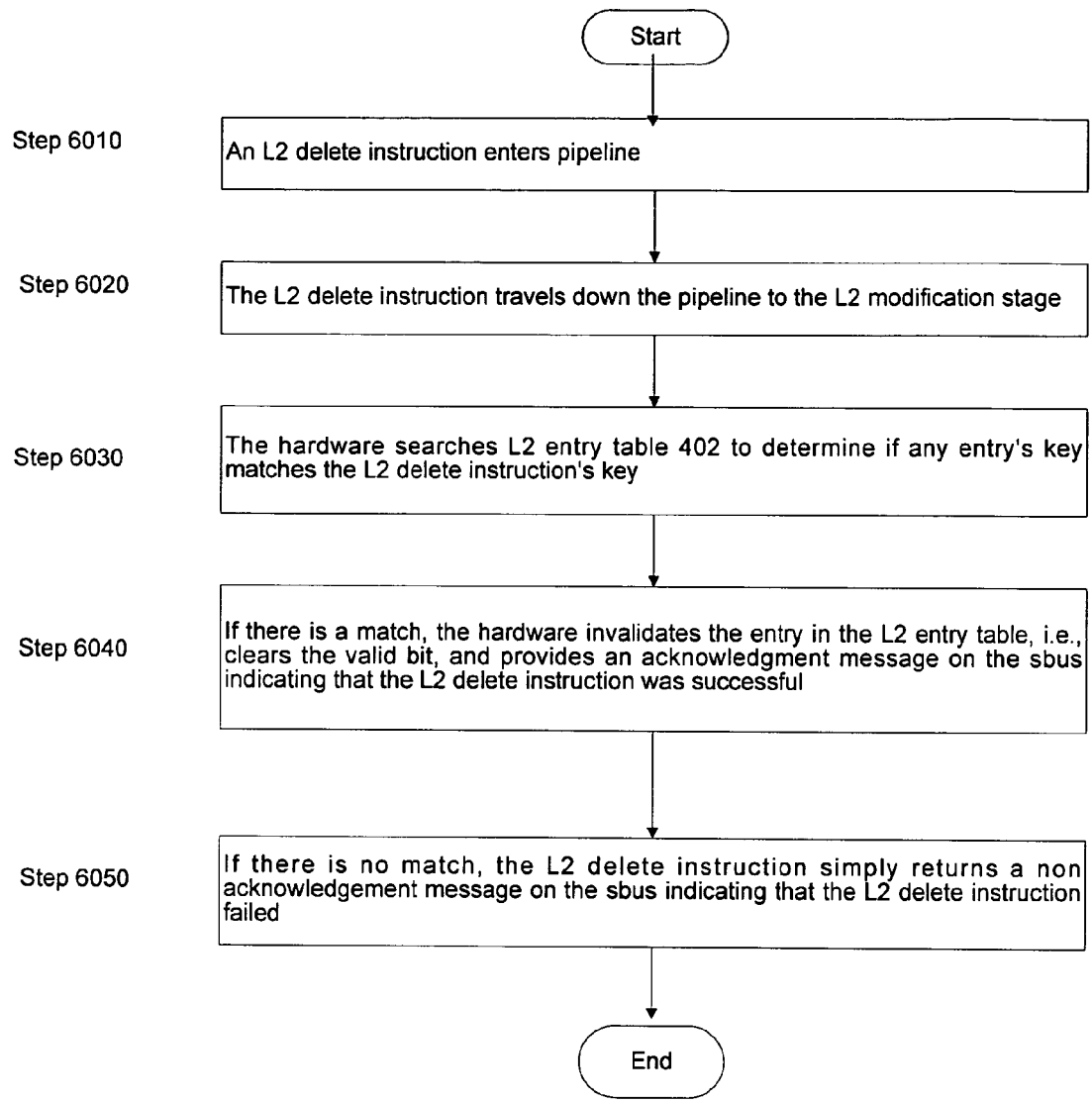
FIG. 6 illustrates the steps implemented in L2 delete operations according to an embodiment of the invention.

FIG. 6 illustrates the steps implemented in L2 delete operations. In Step 6010, L2 delete instructions enter pipeline 200 as an ancillary operation together with L2 delete, age operations learn operation, L3 insert operations, L3 delete operations and CPU reads and writes. In Step 6020, once in pipeline 200, the L2 delete instruction travels down pipeline 200 to stage 306. In Step 6030, the hardware will searches L2 entry table 402 to see if any entry's key matches the L2 delete instruction's key. In Step 6040, if there is a match, the hardware invalidates the entry L2 entry table 402, i.e., clears valid bit 407, and provides an acknowledgment message on the s-bus indicating that the L2 delete instruction was successful. In step 6050, if there is no match, the L2 delete instruction simply returns a non-acknowledgement message on the s-bus indicating that the L2 delete instruction failed.

The system also provides hardware assistance for finding and retrieving L2 entry table 402 entries via a L2 lookup instruction. The L2 lookup instruction performs a search of L2 entry table 402 similar to the L2 delete instruction. Specifically, the L2 lookup instruction tries to find an entry with a matching key. If it finds such the entry, then the L2 lookup instruction returns the associated L2 entry fields on an Overlay Bus. If there's a hit, in addition to returning the data from the entry found, in the bits above the data bits, i.e. the most significant bits, the L2 lookup instruction returns a 14 bit address which is a pointer to the entry found. If there's a miss, the values on the Overlay Bus are equal to the data sent from the s-bus and an index to the bucket that was searched is returned.

While the foregoing description above have been directed to certain embodiments of a network device, it should be apparent to one skilled in the art, however, that other variations and modifications may be made to the described embodiments, with the attainment of some or all of their advantages. Therefore, it is the object of the appended claims to cover all such variations and modifications as come within the true spirit and scope of the invention.

What is claimed:

1. A network device comprising:
ports for sending and receiving data;
a layer 2 table;
a modification buffer; and
an ingress module that includes a first buffer and FIFO buffer, the ingress module being configured for performing lookups for layer 2 switching and for maintaining the layer 2 table and the modification buffer,
wherein the ingress module is configured to add entries to the modification buffer when the layer 2 table is modified and in an order in which the layer 2 table was modified, such that the layer 2 table can be reconstructed based on the entries of the modification buffer,
wherein the ingress module is configured to perform a learn operation, the learn operation including marking a packet for a learn operation and storing a learn entry associated with a packet in the first buffer, wherein the first buffer includes an entry for each port on the network device and each entry includes a first bit for indicating a status of the packet and a second bit for indicating if there is a source address in the entry, and wherein if the status of the packet is known, if the packet is received without errors, and if there is room in the FIFO buffer, the learn entry is copied from the first buffer to the FIFO buffer.

2. The network device of claim 1, wherein the FIFO buffer is configured as a simple queue, wherein an entry at the head of the queue competes with other instructions to enter an ingress pipeline.

3. The network device of claim 1, wherein the first buffer comprises a plurality of entries for storing information and wherein the ingress module is configured to look up entries in the first buffer such that a slot in the first buffer associated with the second bit is available for a new learn instruction when the second bit associated with the slot is clear and the source address in the slot is cleared.

4. The network device of claim 1, wherein the ingress module is configured to implement a round-robin arbitration scheme to determine which entry in the first buffer should be transmitted to the FIFO buffer.

5. The network device of claim 1, wherein the modification buffer comprises a 16 entry table and a counter is used at the beginning of an ingress pipeline to block instructions that would update the modification buffer and cause the modification buffer to overflow.

6. The network device of claim 1, wherein the ingress module is further configured to set a lock bit when entries are read out of the modification buffer, wherein the lock bit prevents new operations that can affect the modification buffer from entering an ingress pipeline.

7. The network device of claim 6, wherein the ingress module is further configured to clear the lock bit after entries are read out the modification buffer and to initialize a write pointer to point to the first entry of the modification buffer.

8. The network device of claim 1, wherein the ingress module is configured to perform one of dynamic enablement or disablement of layer 2 operations by a mode bit, wherein when operations are disabled, no operations are added to the modification buffer.

9. A method for processing packets in a network device, the method comprising:
  performing lookup operations for layer 2 switching;
  maintaining a layer 2 table;
  recording operations performed on the layer 2 table in a modification buffer when the layer 2 table is updated, wherein entries are added to the modification buffer in an order in which the layer 2 table is modified, such that the layer 2 table can be reconstructed based on the entries of the modification buffer;
  scheduling a learn instruction by marking a packet for a learn operation, storing a learn entry associated with the packet in a first buffer, wherein the first buffer includes an entry for each port on the network device and each entry includes a first bit for indicating a status of the packet and a second bit for indicating if there is a source address in the entry, and wherein if the status of the packet is known, if the packet is received without errors, and if there is room in a FIFO buffer, copying the learn entry from the first buffer to the FIFO buffer; and
  wherein the ingress module is configured to perform a learn operation, the learn operation including marking a packet for a learn operation and storing a learn entry associated with a packet in the first buffer, the learn entry is copied from the first buffer to the FIFO buffer.

10. The method of 9, further comprising blocking instructions that will update the modification buffer and cause the modification buffer to overflow when a counter at the beginning of an ingress pipeline is equal to a predefined value.

11. The method of 9, further comprising setting a lock bit when entries are read out of the modification buffer, wherein the lock bit prevents new operations that can affect the modification buffer from entering an ingress pipeline, clearing the lock bit after entries are read out of the modification buffer and initializing a write pointer to point to the first entry of the modification buffer.

12. The method of 9, further comprising dynamically disabling layer 2 operations by a mode bit, wherein no operations are added to the modification buffer.

* * * * *

UNITED STATES PATENT AND TRADEMARK OFFICE
CERTIFICATE OF CORRECTION

| | | |
|---|---|---|
| PATENT NO. | : 7,986,616 B2 | |
| APPLICATION NO. | : 12/535739 | |
| DATED | : July 26, 2011 | |
| INVENTOR(S) | : Bowes et al. | |

It is certified that error appears in the above-identified patent and that said Letters Patent is hereby corrected as shown below:

In column 12, line 18, in claim 10, delete "9," and insert -- claim 9, --, therefor.

In column 12, line 22, in claim 11, delete "9," and insert -- claim 9, --, therefor.

In column 12, line 29, in claim 12, delete "9," and insert -- claim 9, --, therefor.

Signed and Sealed this
Twenty-seventh Day of September, 2011

David J. Kappos
*Director of the United States Patent and Trademark Office*